United States Patent [19]
Keating, Jr.

[11] 3,975,170
[45] Aug. 17, 1976

[54] HYDROGEN CONCENTRATION CONTROL UTILIZING A HYDROGEN PERMEABLE MEMBRANE

[75] Inventor: Stephen Joseph Keating, Jr., West Hartford, Conn.

[73] Assignee: Combustion Engineering, Inc., Windsor, Conn.

[22] Filed: May 13, 1974

[21] Appl. No.: 469,259

Related U.S. Application Data

[63] Continuation-in-part of Ser. No. 418,342, Nov. 23, 1973, abandoned.

[52] U.S. Cl. ........................................ 55/16; 55/18
[51] Int. Cl.² ........................................ B01D 53/22
[58] Field of Search ............... 55/16, 158, 67, 18; 176/37

[56] References Cited
UNITED STATES PATENTS

| | | |
|---|---|---|
| 2,824,620 | 2/1958 | DeRossett .......................... 55/16 |
| 3,247,648 | 4/1966 | McKinley ........................... 55/16 |
| 3,350,846 | 11/1967 | Makrides et al. ................... 55/16 |
| 3,690,835 | 9/1972 | Lovelock ............................ 55/67 |

*Primary Examiner*—John Adee

[57] ABSTRACT

The concentration of hydrogen in a fluid mixture is controlled to a desired concentration by flowing the fluid through one chamber of a diffusion cell separated into two chambers by a hydrogen permeable membrane. A gradient of hydrogen partial pressure is maintained across the membrane to cause diffusion of hydrogen through the membrane to maintain the concentration of hydrogen in the fluid mixture at the predetermined level. The invention has particular utility for the purpose of injecting into and/or separating hydrogen from the reactor coolant of a nuclear reactor system.

3 Claims, 2 Drawing Figures

HYDROGEN CONCENTRATION CONTROL UTILIZING A HYDROGEN PERMEABLE MEMBRANE

This is a continuation-in-part of application Ser. No. 418,342 filed Nov. 23, 1973, now abandoned.

BACKGROUND OF THE INVENTION

1. Field of the Invention

This invention relates to a method of controlling hydrogen concentration in a fluid and more specifically, to a method of controlling hydrogen concentration in the reactor coolant fluid of a nuclear reactor system.

2. Description of the Prior Art

It is well known that certain metals of Group VII of the periodic table are permeable to hydrogen and substantially impermeable to other gases which may be mixed therewith in the commonly found gas mixtures containing hydrogen. The term "hydrogen permeable membrane", as it is used throughout this specification, is intended to include all membranes which are permeable to hydrogen gas and substantially impermeable to other gases. It is also well-known in the art to separate hydrogen from a mixture of such gases by diffusing the hydrogen component of the gas mixture through a hydrogen permeable membrane. Typical of such membranes are those made from palladium alloyed with silver. The mechanism relied upon to achieve this separation is the fact that diffusion of hydrogen across the membrane is sensitive only to a gradient of hydrogen partial pressure across the membrane. Such technology has in the past, been limited to the purification or separation of hydrogen from gas mixtures.

In a typical pressurized water-cooled nuclear reactor, quantities of oxygen are produced during normal operation by the radiolosis of reactor coolant due to intense neutron activity in the core region. Due to the corrosion inducing properties of oxygen, it is necessary that this oxygen be removed from the reactor coolant. In early nuclear plants it was recognized that if a sufficient quantity of hydrogen were introduced into the coolant, it would recombine with the oxygen in the presence of the intense gamma flux in the reactor core.

The most common method of maintaining and controlling the hydrogen concentration in the reactor coolant has been to bleed a portion of the reactor coolant from the reactor coolant system and to pass this coolant through a suitable container in which a hydrogen overpressure is maintained. The pressure of the hydrogen in this tank is dictated by the desired coolant hydrogen concentration.

In typical prior art systems, this tank has been a part of a reactor coolant processing system commonly known as the chemical and volume control system. Such a system removes a stream of coolant from the reactor coolant system and treats it to remove dissolved gases and other impurities. Makeup water and other chemicals are added in the system before the coolant is re-introduced, as required, to the primary reactor coolant system. The coolant treated in the chemical and volume control system is stored in a tank known as the volume control tank prior to being directed back to the reactor coolant system. It is this tank in which a hydrogen overpressure is maintained in order to introduce hydrogen gas into the coolant.

Another of the functions of chemical and volume control systems is to remove any radioactive fission gases such as xenon and krypton which may be present in a dissolved state in the reactor coolant bleed stream. Various techniques of removing these dissolved gases from the coolant have been used in the prior art. In all such systems, however, it has not been possible to selectively remove the radioactive fission gases from the coolant while allowing the hydrogen gas, whose presence is not objected to, to remain dissolved in the treated coolant. As a result, the hydrogen present in the coolant has been removed along with the radioactive fission gases in the gas removal step.

Various methods have been developed and put into use to accomplish the removal of the radioactive fission product gases from the reactor coolant. One method involves the separation, collection and storage of the gases dissolved in the coolant for a period of time in gas decay tanks to permit the decay of the shorter half life radionuclides. These gases are then periodically discharged to the atmosphere or transferred to long term storage tanks. The disadvantages of this system are that: (1) valuable carrier gases such as nitrogen and large volumes of hydrogen must be stored (requiring a large storage capacity) and/or wastefully discharged to the atmosphere along with the less desirable radionuclides; and (2) certain fission products, particularly $Kr^{85}$, have long half lives and their discharge to the atmosphere is not desirable even though the amount of such nuclides is small and far below the maximum permissible concentration.

The adsorption of noble gases on charcoal or molecular sieves at ambient temperatures is the process that has been most extensively proposed and used. This is also a method for delaying the release of the noble gases to the atmosphere in order to allow the short-lived isotopes (primarily xenon) to decay. However, it has certain disadvantages such as (1) large beds of charcoal are required; (2) the charcoal burns readily, and molecular sieves are subject to explosion as the result of local heating of adsorbed gases by radioactive particles; and (3) the $Kr^{85}$ is released to the atmosphere instead of being concentrated for permanent storage. Additional disadvantages with adsorption on charcoal and molecular sieves are the costs incurred in cooling the bed and the explosion hazards associated with the adsorption of the ozone that is produced by the irradiation of oxygen. Materials that would freeze or condense must be completely removed from the gas prior to its injection into the bed in order to prevent plugging of the equipment.

In cryogenic separation, a third process that has been proposed for use, the noble gases and part of the air, or other carrier gas, are first liquified. Then the noble gases are separated from the bulk gases and are concentrated by fractional distillation. As in all of the low temperature operations, water and other gases that would form solids must be essentially removed prior to the treatment of the noble gases. Solids in the system cause physical difficulties, and the presence of liquid ozone, which is formed from the radiolysis of oxygen, creates an explosion hazard.

A fourth very recently developed process involves separating and collecting the radioactive off-gases and either continuously or periodically placing these gases into contact with a thin palladium-silver membrane across which a hydrogen partial gas pressure is maintained. The hydrogen in the off-gas is selectively diffused across the membrane where it is collected and either discharged, stored for later reuse or reused immediately. On the upstream side of the membrane, the undesirable radionuclides are collected and from there deposited in storage or shipping containers for off-site disposal.

It is significant that each of the above recited prior art processes for removal of undesirable radionuclides treats the entire volume of off-gases which has been removed from the reactor coolant letdown flow by a prior gas stripping step. Since the off-gases withdrawn from the water coolant of a nuclear reactor consist primarily of a large volume of hydrogen . . . and a very small volume of the noble gases produced as fission products within the reactor core and leaked into the water coolant, each of the above-described separation processes requires gas stripping and gas separation apparatus of sufficient capacity to handle all of the dissolved gases present in the reactor coolant letdown flow.

Because all of the residual hydrogen gas remaining in the reactor coolant letdown flow is removed from the coolant during the gas removal step, the burden on the apparatus and process for introducing hydrogen into the coolant is accordingly increased, i.e. it must bring the level of hydrogen concentration up to the desired level from a point of zero hydrogen concentration. Generally, the removal of dissolved gases has been carried out on an intermittent basis and thus the hydrogen overpressure technique described previously has been adequate to maintain the desired hydrogen level in the primary coolant loop. Currently, however, reactor systems are being designed on the basis of continuous gas stripping and a more severe requirement for rehydrogenation, which current techniques cannot meet, have been imposed. It has also been postulated that hydrogen introduced into the flow upstream of the pumps which re-introduce the treated coolant to the primary coolant loop, may be outgas at the pump suction and cause performance deterioration. These pumps are commonly referred to as the charging pumps.

As a result of these concerns it has been suggested that hydrogen be introduced into the returning coolant flow downstream of the charging pumps in a region of high pressure. The metering of the relatively small hydrogen flow required at the high pressures present here would be understandably difficult. As an example, a typical volume flow at such a point in the system would be 0.191 SCFM, into a region at 2250 psig. At this pressure, this would be an actual volume flow of only 0.00127 cubic feet per minute. There would also be the obvious requirement to store and supply hydrogen at high pressures; a hazardous and expensive requirement.

SUMMARY OF THE INVENTION

The present invention makes use of the technology developed in connection with hydrogen purification by diffusion through hydrogen permeable membranes to achieve a method for controlling the concentration of hydrogen in a fluid mixture. The method involves passing the fluid mixture whose hydrogen concentration is to be controlled through one chamber of a diffusion cell separated into two chambers by a hydrogen permeable membrane. A gradient of hydrogen partial pressure is then maintained across the membrane at a level sufficient to cause diffusion of hydrogen through the membrane to maintain the concentration of hydrogen in the fluid mixture at a predetermined level.

The hydrogen concentration of the fluid may be controlled to some positive value by maintaining a second fluid containing hydrogen gas in the other chamber of the diffusion cell, or, the hydrogen concentration in the fluid may be controlled to a value approximating zero hydrogen concentration by maintaining a near vacuum in the other chamber of the diffusion cell.

A particularly useful embodiment of the invention involves the injection of hydrogen into the reactor coolant of a nuclear reactor system. The reactor coolant is flowed through one of the diffusion cell chambers at a high pressure and temperature. Hydrogen is maintained in the other chamber at a pressure which is low compared to the coolant total pressure. The low hydrogen pressure is sufficient to cause hydrogen diffusion across the membrane into the region of high total pressure, since the diffusion rate across the membrane is dependent only upon the difference in hydrogen partial pressures.

Further, in accordance with the invention, a system for managing hydrogen gas concentration in the letdown flow from a nuclear reactor coolant system is disclosed which operates in conjunction with a reactor coolant system chemical and volume control system. A first palladium-silver membrane hydrogen gas diffusion cell is used to separate out hydrogen and its isotopes from the reactor coolant letdown flow, which is in a liquid state, upstream of the point from which the gas stripping step is carried out. The hydrogen removed from the coolant letdown flow at this point is combined with a flow of makeup hydrogen and reintroduced into the reactor coolant through a second palladium-silver membrane hydrogen gas diffusion cell at a point downstream of the reactor coolant system charging pumps.

DESCRIPTION OF THE PREFERRED EMBODIMENTS

Figure 1:
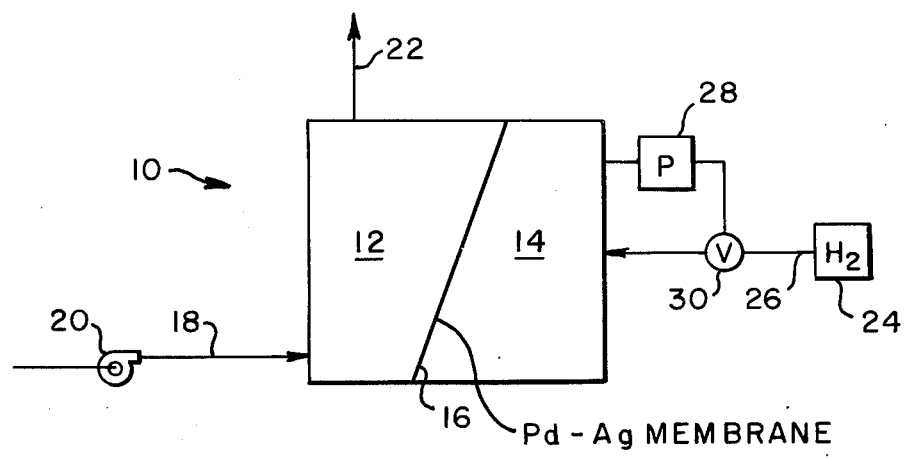
FIG. 1 is a simplified flow diagram of a gas diffusion cell as used in conjunction with the present invention.

Referring to FIG. 1 there is shown a gas diffusion cell 10 defining a diffusion zone which is divided into two chambers 12, 14 by a hydrogen permeable membrane 16. In the preferred embodiment this membrane is fabricated from a palladium-silver alloy, although any of the well-known hydrogen permeable membranes could be used.

The first chamber 12 has communicating therewith an inlet conduit 18 which is connected to a suitable supply (not shown) of the fluid mixture to be hydrogenated. A suitable pump 20 for introducing the fluid to the chamber is disposed along the inlet conduit. An outlet 22, through which the hydrogenated mixture is passed from the first chamber is provided at the upper end of the first chamber 12.

The second chamber 14 is connected to a source of hydrogen gas 24 through hydrogen introduction line 26. A pressure regulator 28 monitors the hydrogen pressure in the second chamber and through a suitable control valve 30 located in the line 26 is set to control the pressure of hydrogen gas in the second chamber 14 to a desired level.

In practice, the desired hydrogen concentration of the fluid exiting from the first chamber, through conduit 22 is first determined. The hydrogen partial pressure corresponding to this concentration is then determined using Henry's Law Coefficient Charts for the appropriate fluid mixture. For example, assuming a fluid comprised substantially of water at a temperature of 120°F, the coefficient is 0.925 psia/(scc/Kg). Applying this coefficient it is seen that for a desired hydrogen concentration of 10 cc of $H_2$/Kg the partial pressure must be:

$$0.925 \text{ psia/(scc/Kg)} \times 10 \text{ scc/Kg} = 9.25 \text{ psia}$$

Similarly, for a desired hydrogen concentration of 50 cc $H_2$/Kg water the partial pressure must be 46.25 psia.

Once the desired hydrogen partial pressure in the fluid to be hydrogenated is known, the selection of a suitable size membrane, temperature of operation, and the hydrogen pressure which must be maintained in the second chamber may be readily determined from data available in the literature. For example, cells which are used for purification of hydrogen are conventional, commercially available pieces of equipment, such as that manufactured by Matthey Bishop, Inc. under the trade name "Bishop Palladium Alloy Hydrogen Purification Cell", or by Engelhard Corporation under the trade name "Engelhard Hydrogen Diffusion Purifier", and are provided with operating data including diffusion rates for a wide range of operating parameters.

Such commercially available devices are not generally designed to operate at high pressure differentials and thus in applications where the mixture to be hydrogenated is at a high total pressure, a membrane having supplemental structural support may be desirable. A membrane structure, wherein the hydrogen permeable membrane is supported by a structurally rigid porous matrix is disclosed in U.S. Pat. No. 2,824,620 entitled "Purification of Hydrogen Utilizing Hydrogen Permeable Membranes" by Armand J. deRosset. Such a membrane, with the pourous matrix on the hydrogen gas side of the diffusion cell would be suitable for use in practicing the present invention.

A particularly attractive application of this invention is for introducing hydrogen into the reactor coolant of a nuclear reactor coolant system. The exemplary hydrogen concentrations set forth in the above discussion, i.e., 10 and 50 scc $H_2$/Kg water are representative of the upper and lower limits of the range of hydrogen desired in the coolant of a typical nuclear reactor system. The range of hydrogen partial pressure in the coolant should thus be controlled to lie between about 9.25 and 46.25 psia in order to achieve the desired range of hydrogen concentration.

As has already been pointed out, the introduction of hydrogen into the coolant may be carried out immediately downstream of the reactor coolant system charging pumps. In this region, the coolant is at a high pressure, e.g. around 2250 psig and a relatively low temperature, e.g. between 120° and 300°F.

In most reactor systems, however, the coolant is reheated by passage through a regenerative heat exchanger located within the reactor containment, prior to re-introduction to the reactor coolant loop. A particularly attractive location for carrying out the hydrogenation of the coolant is downstream of this heat exchanger where both the pressure and temperature are high. The increased temperature results in a favorable increase in the hydrogen diffusion rate, thus requiring a smaller membrane area and/or lower pressure in the hydrogen chamber. The example set forth below illustrates the temperature, and hydrogen partial pressure dependence of the diffusion rate of hydrogen through a Pd-Ag membrane.

Assuming a makeup coolant flow rate, through the first chamber of 88 gallons per minute and a desired hydrogen partial pressure of 15 psia, it is calculated, using well-known techniques, that 0.191 SCFM of hydrogen must pass through the membrane into the coolant flow. The table below sets forth a number of combinations of operating parameters for the diffusion cell which will result in the desired 15 psia partial pressure. These values are determined using published data for a 0.003 inch thick 75% Pd–25% Ag alloy membrane.

| Operating Temperature | $H_2$ Pressure in Hydrogen Chamber | Membrane Free Area (approx.) |
|---|---|---|
| 120°F | 215 psia | 1300 in² |
| 200°F | 45 psia | 1700 in² |
| 200°F | 215 psia | 520 in² |
| 300°F | 115 psia | 260 in² |
| 300°F | 215 psia | 130 in² |
| 700°F | 215 psia | 29.3 in² |

Figure 2:
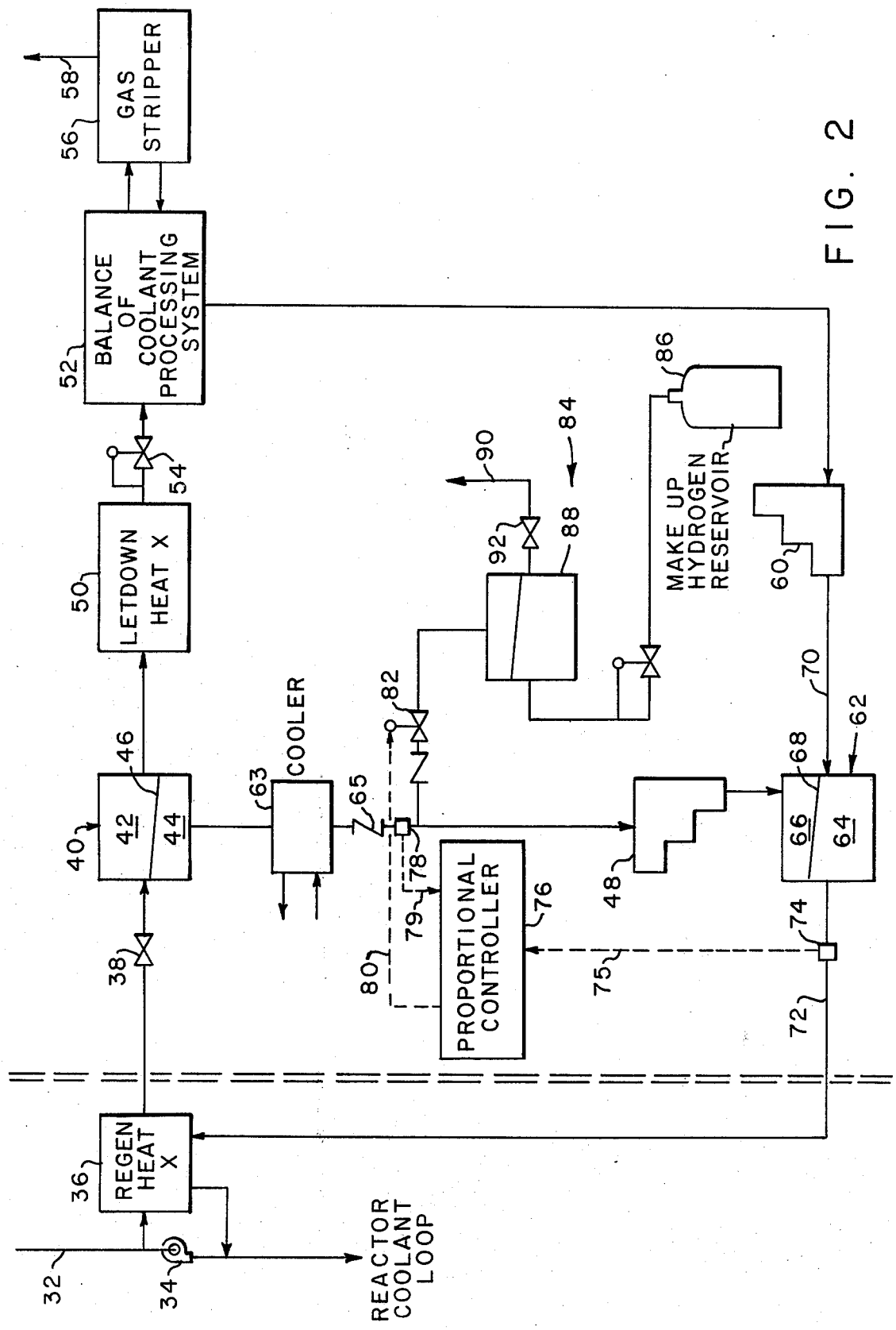
FIG. 2 is a flow diagram of a system for managing hydrogen gas concentration in the letdown flow from a nuclear reactor coolant system.

FIG. 2 is a schematic representation of a reactor coolant processing system incorporating the principle of the present invention for removing hydrogen from the reactor coolant and for re-introducing the removed hydrogen along with a portion of makeup hydrogen flow into the reactor coolant loop using a hydrogen diffusion cell operating as described above. A loop of the reactor coolant system is represented by pipe 32 through which the coolant is circulated to and from the reactor core and one of the nuclear steam generators (not shown) by coolant pump 34. A portion of the coolant water, referred to as the letdown flow, is removed from the reactor coolant loop 32 upstream of the reactor coolant pump 34. In a typical system, the letdown flow is approximately 84 gpm and is at a pressure of about 2207 psig and a temperature of 558°F. This withdrawn coolant is then cooled in the regenerative heat exchanger 36 to a temperature of about 327°F, the pressure dropping to approximately 2161 psig. The coolant is then further reduced in pressure by means of a letdown control valve 38 to a pressure of around 481 psig. At this point in the system the partial pressure of hydrogen gas in the letdown coolant flow in the typical system being described is approximately 8.29 psia. The reactor coolant letdown flow is then passed to a first palladium-silver hydrogen separation cell 40 which is divided into first and second chambers 42, 44, respectively by palladium-silver membrane 46. A hydrogen pump 48 is in flow communication with the second chamber 44 of the cell 40 and the suction of this pump 48 tends to draw a vacuum in the second chamber 44. As a result the reactor coolant letdown flow flowing into the first chamber 42 at a total pressure of 481 psig and a partial hydrogen pressure of 8.29 psia tends to cause a flow of hydrogen gas across the membrane 46 from the first chamber 42 into the second chamber 44 due to the hydrogen partial pressure differential existing between the two chambers. The dehydrogenated letdown flow passing from the first chamber 42 is then passed to the letdown heat exchanger 50 where the temperature of the coolant is further reduced to a level which is consistent with the temperature of ion exchange resins present in various apparatus in the balance of the coolant processing system 52, and to prevent flashing of the coolant after further reduction of pressure by means of a back pressure control valve 54.

One of the steps to which the coolant is subjected in the coolant processing system is a gas stripping step which is performed in the gas stripper 56. The gas removed in the gas stripper 56 is comprised primarily of the radionuclide gases xenon and krypton and a small volume of residual hydrogen which remained in the letdown flow passing from the first hydrogen separation 40. It should be noted that the gas stripping capacity of this gas stripper is significantly lower than would otherwise be required due to the prior removal of the bulk of the hydrogen gas from the letdown flow in the hydrogen separator 40. The gases removed from the coolant in the gas stripper are passed via line 58 to the waste gas system for further processing and disposal.

The reactor coolant flowing from the balance of the coolant processing system has been reduced in pressure to approximately 20 psig and is at a temperature of about 120°F. This flow then passes to the reactor coolant system charging pump 60 in which the pressure of the fluid is raised to approximately 2370 psig. The fluid exiting from the high pressure side of the charging pump 60 is directed to a second gas diffusion cell 62 where the hydrogen concentration in the coolant is raised to the desired level of hydrogen in the coolant in the reactor primary coolant loop. In the typical system being described this requires raising the hydrogen concentration from approximately zero psia upon entry into the cell to approximately 15 psia on the exit side. This second gas diffusion cell 62 functions to inject hydrogen into the coolant exactly as described previously in connection with FIG. 1 of the drawings. As in the previously described embodiment, this gas diffusion cell is divided into a first chamber 64 and a second chamber 66 by a palladium-silver membrane 68. The high pressure reactor coolant flow passes into the first chamber 64 through inlet line 70 and the hydrogenated coolant passes from the first chamber via line 72. A supply of hydrogen gas is maintained in the second chamber 66 at a pressure sufficient to cause diffusion flow of hydrogen gas, across the membrane 68, into the first chamber and thus into the reactor coolant.

It should be noted that the hydrogen pump 48 which directs the hydrogen gas to the second chamber 66 of the second hydrogen diffusion cell 62 is the same pump which is used to draw a vacuum on the second chamber 44 of the first hydrogen diffusion cell 40. Accordingly, the hydrogen gas removed from the reactor coolant loop letdown flow in gas diffusion cell 40 is being reintroduced into the coolant flow in the second gas diffusion cell 62. A cooler 63 is provided in the line running from the first cell 40 to the pump 48 to cool the hydrogen gas passing from the first hydrogen diffusion cell prior to its passing to the hydrogen pump. This cooling is carried out primarily to reduce the volume of the hydrogen gas and thus increase the efficiency of the pump and also to bring this hydrogen to a common temperature with the coolant flowing into the second hydrogen diffusion cell 62. The pump 48 may be multistaged with intercooling to improve its performance. A check valve 65 is provided in the hydrogen line between the cooler 63 and the hydrogen pump 48 to prevent inadvertent backflow of hydrogen into the second zone 44 of the first hydrogen diffusion cell 40.

Since the flow rate of coolant through the second diffusion cell 62 may vary depending on the amount of makeup fluid which the reactor coolant processing system is called upon to introduce into the reactor coolant system, means are provided to sense this flow rate and, in response thereto, regulate the supply of hydrogen to the second chamber 66 of this diffusion cell to ensure that the proper hydrogen flow rate and hydrogen partial pressure gradient is maintained across the palladium-silver membrane 68. The makeup water flow rate passing from the second diffusion cell 62 is sensed by a flow meter 74 which provides an input signal 75 to a proportional controller 76 of known construction. A second flow meter 78 located in the hydrogen line just before the hydrogen pump 48 senses the flow of hydrogen gas into the pump. This information, in the form of a record input signal 79, is also fed into the proportional controller 76. The proportional controller 76 is programmed in advance with data relating to the desired hydrogen flow rate to the chamber 66, for a particular makeup water flow rate, (as measured at 74) and thus the signals 75, 79 from the two flow meters 74, 78 respectively are fed into a comparator in the proportional controller and a third signal 80 is generated which is proportional to the additional quantity of hydrogen gas necessary to supplement the flow of hydrogen from the first separation cell 40, in order to provide the desired hydrogen gas flow rate to the second chamber 66 of the second gas diffusion cell 62. This signal 80, in turn, operates a hydrogen makeup flow valve 82 which controls the rate of flow from a hydrogen makeup system 84.

The hydrogen makeup system 84 includes a makeup hydrogen reservoir 86, typically a tank of commercially available hydrogen gas and a third hydrogen diffusion cell 88 which serves to purify the hydrogen from the hydrogen makeup reservoir prior to combining it with the ultrapure hydrogen, from the first cell 40, and ultimate reintroduction into the reactor coolant system in the record cell 62. A purge vent 90 controlled by control valve 92 is provided to periodically or continuously purge impurities from the third hydrogen diffusion cell 88.

The above described method is thus capable of accurately controlling the hydrogen concentration in the coolant fluid of a nuclear reactor system. In addition to accurate hydrogen concentration control, the hydrogen present in the portion of coolant removed from the reactor coolant system for passage through the reactor coolant processing system is removed from the coolant in a readily recyclable form, prior to further treatment in the coolant processing system. As a result the dissolved gases removed from the coolant in the coolant processing system are all waste gases, occupying a small volume and thus further processing and/or storage requires significantly smaller volume capacity equipment.

While these preferred embodiments of the invention have been shown and described, it will be understood that they are merely illustrative and that changes may be made without departing from the scope of the invention as claimed.

What is claimed is:

1. A method of controlling hydrogen concentration of the fluid in the reactor coolant system of a nuclear reactor system comprising the steps of:

flowing a portion of said reactor coolant through the first chamber of a first diffusion cell separated into a first chamber and a second chamber by a first hydrogen permeable membrane;

maintaining a gradient of hydrogen partial pressure across said membrane sufficient to cause diffusion of substantially all hydrogen contained in said portion of coolant through said membrane;

removing other dissolved gases from said portion of reactor coolant fluid which has passed from said first chamber of said first diffusion cell;

flowing said portion of reactor coolant fluid through the first chamber of a second diffusion cell separated into a first chamber and a second chamber by a second hydrogen permeable membrane;

introducing a gas containing essentially hydrogen into said second chamber of said second diffusion cell; and maintaining a gradient of hydrogen partial pressure across said second membrane sufficient to cause diffusion of hydrogen through said second membrane to said portion of reactor coolant to maintain the concentration of hydrogen in said coolant at a desired predetermined level.

2. The method of claim 1 wherein said gas containing essentially hydrogen introduced with said second chamber of said second cell comprises the hydrogen gas removed from said portion of reactor coolant in said first diffusion cell.

3. The method of claim 2 further comprising:

generating a signal proportional to the rate of coolant flow passing from said first chamber of said second diffusion cell;

generating a second signal proportional to the rate of flow of hydrogen gas passing from said first diffusion cell to said second diffusion cell;

comparing said first signal and said second signal and in response thereto generating a third signal, said third signal being directly proportional to the additional quantity of hydrogen gas which must be provided in the second chamber of said second diffusion cell in order to provide sufficient hydrogen flow through said second palladium-silver membrane to said first chamber of said second diffusion cell sufficient to maintain the hydrogen partial pressure gradient in said second cell necessary to increase the hydrogen concentration of the reactor coolant fluid flowing through said second cell, as represented by said first signal to said desired predetermined level;

introducing an additional quantity of hydrogen gas into said second chamber of said second diffusion cell in proportion to said third signal.

* * * * *